US012600887B2

(12) United States Patent
Carney

(10) Patent No.: US 12,600,887 B2
(45) Date of Patent: Apr. 14, 2026

(54) ONE-PART ADHESIVE FOR THERMOPLASTIC URETHANES

(71) Applicant: LORD Corporation, Cary, NC (US)

(72) Inventor: Brian Carney, Erie, PA (US)

(73) Assignee: LORD Corporation, Cary, NC (US)

( * ) Notice: Subject to any disclaimer, the term of this patent is extended or adjusted under 35 U.S.C. 154(b) by 706 days.

(21) Appl. No.: 17/629,825

(22) PCT Filed: Jul. 24, 2020

(86) PCT No.: PCT/US2020/043388
§ 371 (c)(1),
(2) Date: Jan. 25, 2022

(87) PCT Pub. No.: WO2021/016514
PCT Pub. Date: Jan. 28, 2021

(65) Prior Publication Data

US 2022/0267652 A1 Aug. 25, 2022

Related U.S. Application Data

(60) Provisional application No. 62/878,482, filed on Jul. 25, 2019.

(51) Int. Cl.
*C09J 171/00* (2006.01)
*C09J 151/08* (2006.01)
*C09J 179/08* (2006.01)

(52) U.S. Cl.
CPC ........... *C09J 151/08* (2013.01); *C09J 171/00* (2013.01); *C09J 179/08* (2013.01)

(58) Field of Classification Search
CPC ....... C09J 151/08; C09J 171/00; C09J 179/08
USPC .......................................................... 524/280
See application file for complete search history.

(56) References Cited

U.S. PATENT DOCUMENTS

| | | | |
|---|---|---|---|
| 4,395,528 A | 7/1983 | Leiner | |
| 4,403,046 A * | 9/1983 | Anderson | C08G 16/02 523/144 |
| 5,266,611 A | 11/1993 | Teschendorf | |
| 6,034,160 A | 3/2000 | Eaton et al. | |
| 2010/0059179 A1 | 3/2010 | Tribelhorn | |
| 2012/0138345 A1 | 6/2012 | Amou et al. | |
| 2018/0244965 A1 | 8/2018 | Mowrey | |
| 2018/0298253 A1 | 10/2018 | Bai | |
| 2019/0047041 A1 * | 2/2019 | Ladégourdie | C08K 5/42 |
| 2020/0024493 A1 | 1/2020 | Kuwahara | |
| 2020/0025227 A1 | 1/2020 | Timms | |

FOREIGN PATENT DOCUMENTS

| | | | |
|---|---|---|---|
| CN | 108138021 | A | 6/2018 |
| JP | 2002097443 | A | 4/2002 |
| JP | 2018070770 | A | 5/2018 |
| JP | 2018134826 | A | 8/2018 |
| WO | 2017053402 | A1 | 3/2017 |
| WO | WO 2017/100750 | A1 | 6/2017 |
| WO | WO 2018/152489 | A1 | 8/2018 |
| WO | 2020117722 | A1 | 6/2020 |

OTHER PUBLICATIONS

International Search Report and Written Opinion for Application No. PCT/US2020/043388 dated Oct. 6, 2020.

Chinese Office Action for Application No. 202080053601 dated Nov. 8, 2023.

European Office Action for Application No. 20754523 dated Jan. 2, 2024.

Indian Office Action for Application No. 202217001623 dated Apr. 8, 2022.

Chinese Office Action for Application No. 201900902849 dated Jun. 22, 2022.

Chinese Office Action for Application 201900902849 dated Dec. 2, 2022.

Chinese Office Action for Application No. 201800902849 dated Apr. 23, 2023.

Database WIP week 201834, Thomson Scientific, London, GB; AN 2018-362346, XP002798017.

Indian Office Action for Application No. 202117025923 dated Dec. 8, 2021.

International Search Report and Written Opinion for Application No. PCT/US2019/064103 dated Mar. 13, 2020.

Chinese Office Action for Application No. 202080053601 dated Sep. 5, 2022.

Indian Office Action for Application No. 202217001623 dated Nov. 3, 2022.

Chinese Office Action for Application No. 202080053601 dated Mar. 30, 2023.

European Office Action for Application No. 20754523 dated Jun. 1, 2023.

European Intention to Grant in EP Application No. 20754523.7 dated Feb. 19, 2026, 32 pages.

* cited by examiner

*Primary Examiner* — Ruiyun Zhang
(74) *Attorney, Agent, or Firm* — KDW FIRM PLLC

(57) ABSTRACT

A one-part adhesive including a grafted phenoxy resin, a polymaleimide compound, an organic carbonate, and an optional silane adhesion promoter is described. More particularly, the grafted phenoxy resin includes carboxylic acid and acrylate ester functionality. Methods of using adhesives to bond a thermoplastic urethane to a rigid substrate, e.g., in an injection or compression molding process, are also described.

19 Claims, No Drawings

ONE-PART ADHESIVE FOR THERMOPLASTIC URETHANES

CROSS-REFERENCE TO RELATED APPLICATION

This application claims the benefit of U.S. Provisional Patent Application Ser. No. 62/878,482, filed Jul. 25, 2019, the disclosure of which is incorporated herein by reference in its entirety.

TECHNICAL FIELD

The presently disclosed subject matter relates to a one-part adhesive composition comprising a grafted phenoxy resin and to related bonded assemblies and methods of using adhesives in injection or compression molding operations, such as those involving bonding thermoplastic urethane elastomers to metals and other rigid substrates.

BACKGROUND

Thermoplastic urethanes (TPUs) fall into a sub-category of thermoplastic elastomers (TPEs). TPEs are copolymers or a mix of polymers which consist of materials with both thermoplastic and elastomeric properties. The type of crosslinking that occurs within thermoplastic elastomers, e.g., involving dipole or hydrogen bonding in one of the phases, is much weaker than the type of crosslinking that occurs in thermosetting elastomers, which typically involves the formation of covalent bonds.

Two resins widely used in adhesive systems for TPUs are polyvinyl butyral (PVB) and phenoxy resins. These resins are used for their compatibility with polar surfaces (e.g., metal substrates); their interactions with polyurethane (PU), polyester and nylon-type surfaces; their ability to hydrogen bond with polar hydroxyl groups; and their compatibility with soft segments of PU (e.g., leading to physical crosslinking or entanglements). Other functional groups and/or materials that have been used in these adhesive systems include silanes/adducts, compounds with isocyanate and/or amino groups, phenolics (e.g., melamines are frequently coupled with PVB or phenoxy type resins), and urethanes. These groups or compounds are often used to crosslink phenoxy resin and PVB resin. They can also help with chemisorption at the metal surface and provide hydrogen bonding to the TPU. For instance, isocyanate groups can react with the NH group on the urethane linkage of the TPU to form a urea and thus crosslink into the TPU.

TPUs are typically formed through a polyaddition reaction between a polyol (e.g., a diol) and a diisocyanate. Special properties attributed to TPUs include, but are not limited to, high abrasion resistance, high elasticity, resistance to certain chemicals, weatherability, and recyclability. These properties allow for a wide range of applications, including, for example, caster wheels, glass laminates, hose liners, seals, footwear, and sporting equipment. Accordingly, TPUs are used in many industrial, automotive, and consumers goods that involve thermoplastic polymers. In many of these applications, it can be desirable to bond the TPU to a rigid substrate, e.g., in an over-molding injection process, as this provides a quick and efficient approach for turning high quality parts. However, most TPU adhesives on the market today are not designed to handle the lower mold temperatures (75-100° F.) and extremely quick processing time (less than 1 minute). The TPU is typically melted in the range of 190-210° C. and injected (over molded) onto a part that has a dried adhesive. The part starts cooling rapidly after injection and this, coupled with the fact that there are no thermosetting moieties available for covalent bonding, can make it difficult to achieve rubber tearing bonds.

Accordingly, there is an ongoing need for additional adhesive compositions that can be used to bond TPUs to rigid substrates, such as those that can provide rubber tearing bonds in short mold times and/or at lower mold temperatures.

SUMMARY

This summary lists several embodiments of the presently disclosed subject matter, and in many cases lists variations and permutations of these embodiments. This summary is merely exemplary of the numerous and varied embodiments. Mention of one or more representative features of a given embodiment is likewise exemplary. Such an embodiment can typically exist with or without the feature(s) mentioned; likewise, those features can be applied to other embodiments of the presently disclosed subject matter, whether listed in this summary or not. To avoid excessive repetition, this Summary does not list or suggest all possible combinations of such features.

In some embodiments, the presently disclosed subject matter provides a curable adhesive comprising: (A) a grafted phenoxy resin, (B) a polymaleimide compound, (C) an organic carbonate, and optionally (D) a silane adhesion promoter, wherein the grafted phenoxy resin comprises carboxylic acid and/or ester functionality. In some embodiments, the grafted phenoxy resin comprises a phenoxy resin grafted with methacrylic acid and/or methyl methacrylate. In some embodiments, the ester functionality comprises a $-COOCH_3$ moiety.

In some embodiments, the organic carbonate comprises propylene carbonate. In some embodiments, the organic carbonate comprises diphenyl carbonate.

In some embodiments, the adhesive is disposed between a thermoplastic urethane and a metal substrate.

In some embodiments, the grafted phenoxy resin comprises about 10 to about 96 percent by weight based on the total of A+B+C. In some embodiments, the polymaleimide compound comprises about 2 to about 75 weight percent based on the total of A+B+C. In some embodiments, the organic carbonate comprises up to about 80 weight percent based on the total of A+B+C.

In some embodiments, the adhesive comprises a silane adhesion promoter and the silane adhesion promoter comprises at least one of an epoxy functional silane or a ureidosilane.

In some embodiments, the adhesive is employed to bond a liquid-introduced thermoplastic urethane to a rigid substrate in a mold.

In some embodiments, the presently disclosed subject matter provides a bonded assembly comprising a liquid introduced thermoplastic urethane bonded to a rigid substrate with an adhesive comprising a grafted phenoxy resin, a polymaleimide, an organic carbonate and optionally an adhesion promoter. In some embodiments, the rigid substrate comprises at least one of polycarbonate, polyamide, stainless steel, and aluminum.

In some embodiments, the presently disclosed subject matter provides a method of bonding two dissimilar materials in an injection or compression molding process comprising: selecting a rigid substrate, selecting a liquid introduced substrate, and providing an adhesive comprising a grafted phenoxy resin, a polymaleimide, an organic carbonate and optionally an adhesion promoter. In some embodiments, the grafted phenoxy resin comprises carboxylic acid and/or ester functionality.

In some embodiments, the presently disclosed subject matter provides a method of bonding two dissimilar materials in an injection or compression molding process comprising: selecting a rigid substrate, selecting a liquid introduced thermoplastic urethane, and providing an adhesive comprising a grafted phenoxy resin and a silane adhesion promoter. In some embodiments, the grafted phenoxy resin comprises carboxylic acid and/or ester functionality. In some embodiments, the silane adhesion promoter is an epoxy functional silane. In some embodiments, the epoxy functional silane comprises glycidoxypropyltrimethoxysilane. In some embodiments, the rigid substrate comprises a metal substrate.

Accordingly, it is an object of the presently disclosed subject matter to provide a one-part adhesive composition and related methods and bonded assemblies. This and other objects are achieved in whole or in part by the presently disclosed subject matter. Further, an object of the presently disclosed subject matter having been stated above, other objects and advantages of the presently disclosed subject matter will become apparent to those skilled in the art after a study of the following description and examples.

DETAILED DESCRIPTION

The presently disclosed subject matter now will be described more fully hereinafter, in which some, but not all embodiments of the presently disclosed subject matter are described. Indeed, the presently disclosed subject matter can be embodied in many different forms and should not be construed as limited to the embodiments set forth herein; rather, these embodiments are provided so that this disclosure will satisfy applicable legal requirements.

I. Definitions

The terminology used herein is for the purpose of describing particular embodiments only and is not intended to be limiting of the presently disclosed subject matter.

While the following terms are believed to be well understood by one of ordinary skill in the art, the following definitions are set forth to facilitate explanation of the presently disclosed subject matter.

All technical and scientific terms used herein, unless otherwise defined below, are intended to have the same meaning as commonly understood by one of ordinary skill in the art. References to techniques employed herein are intended to refer to the techniques as commonly understood in the art, including variations on those techniques or substitutions of equivalent techniques that would be apparent to one of skill in the art. While the following terms are believed to be well understood by one of ordinary skill in the art, the following definitions are set forth to facilitate explanation of the presently disclosed subject matter.

In describing the presently disclosed subject matter, it will be understood that a number of techniques and steps are disclosed. Each of these has individual benefit and each can also be used in conjunction with one or more, or in some cases all, of the other disclosed techniques.

Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

Following long-standing patent law convention, the terms “a”, “an”, and “the” refer to “one or more” when used in this application, including the claims. Thus, for example, reference to “a component” includes a plurality of such components, and so forth.

Unless otherwise indicated, all numbers expressing quantities of ingredients, reaction conditions, and so forth used in the specification and claims are to be understood as being modified in all instances by the term “about”. Accordingly, unless indicated to the contrary, the numerical parameters set forth in this specification and attached claims are approximations that can vary depending upon the desired properties sought to be obtained by the presently disclosed subject matter.

As used herein, the term “about,” when referring to a value or to an amount of a composition, dose, mass, weight, temperature, time, volume, concentration, percentage, etc., is meant to encompass variations of in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed methods or employ the disclosed compositions.

The term “comprising”, which is synonymous with “including” “containing” or “characterized by” is inclusive or open-ended and does not exclude additional, unrecited elements or method steps. “Comprising” is a term of art used in claim language which means that the named elements are essential, but other elements can be added and still form a construct within the scope of the claim.

As used herein, the phrase “consisting of” excludes any element, step, or ingredient not specified in the claim. When the phrase “consists of” appears in a clause of the body of a claim, rather than immediately following the preamble, it limits only the element set forth in that clause; other elements are not excluded from the claim as a whole.

As used herein, the phrase “consisting essentially of” limits the scope of a claim to the specified materials or steps, plus those that do not materially affect the basic and novel characteristic(s) of the claimed subject matter.

With respect to the terms “comprising”, “consisting of”, and “consisting essentially of”, where one of these three terms is used herein, the presently disclosed and claimed subject matter can include the use of either of the other two terms.

As used herein, the term “and/or” when used in the context of a listing of entities, refers to the entities being present singly or in combination. Thus, for example, the phrase “A, B, C, and/or D” includes A, B, C, and D individually, but also includes any and all combinations and subcombinations of A, B, C, and D.

As used herein the term “alkyl” refers to $C_{1-20}$ inclusive, linear (i.e., “straight-chain”), branched, or cyclic, saturated or at least partially and in some cases fully unsaturated (i.e., alkenyl and alkynyl) hydrocarbon chains, including for example, methyl, ethyl, propyl, isopropyl, butyl, isobutyl, tert-butyl, pentyl, hexyl, octyl, ethenyl, propenyl, butenyl, pentenyl, hexenyl, octenyl, butadienyl, propynyl, butynyl, pentynyl, hexynyl, heptynyl, and allenyl groups. “Branched” refers to an alkyl group in which a lower alkyl group, such as methyl, ethyl, or propyl, is attached to a linear alkyl chain. “Lower alkyl” refers to an alkyl group having 1 to about 8 carbon atoms (i.e., a $C_{1-8}$ alkyl), e.g., 1, 2, 3, 4, 5, 6, 7, or 8 carbon atoms. “Higher alkyl” refers to an alkyl group having about 10 to about 20 carbon atoms, e.g., 10, 11, 12, 13, 14, 15, 16, 17, 18, 19, or 20 carbon atoms. In certain embodiments, "alkyl" refers, in particular, to $C_{1-8}$ straight-chain alkyls. In other embodiments, "alkyl" refers, in particular, to $C_{1-8}$ branched-chain alkyls.

Alkyl groups can optionally be substituted (a "substituted alkyl") with one or more alkyl group substituents, which can be the same or different. The term "alkyl group substituent" includes but is not limited to alkyl, substituted alkyl, halo, arylamino, acyl, hydroxyl, aryloxyl, alkoxyl, alkylthio, arylthio, aralkyloxyl, aralkylthio, carboxyl, alkoxycarbonyl, oxo, and cycloalkyl. In some embodiments, there can be optionally inserted along the alkyl chain one or more oxygen, sulfur or substituted or unsubstituted nitrogen atoms, wherein the nitrogen substituent is hydrogen, lower alkyl (also referred to herein as "alkylaminoalkyl"), or aryl.

Thus, as used herein, the term "substituted alkyl" includes alkyl groups, as defined herein, in which one or more atoms or functional groups of the alkyl group are replaced with another atom or functional group, including for example, alkyl, substituted alkyl, halogen, aryl, substituted aryl, alkoxyl, hydroxyl, nitro, amino, alkylamino, dialkylamino, sulfate, and mercapto.

"Alkoxyl" refers to an alkyl-O-group wherein alkyl is as previously described. The term "alkoxyl" as used herein can refer to, for example, methoxyl, ethoxyl, propoxyl, isopropoxyl, butoxyl, t-butoxyl, and pentoxyl. The terms "alkoxy" and "oxyalkyl" can be used interchangeably with "alkoxyl".

The term "silyl" refers to groups comprising silicon atoms (Si).

The term "silane" refers to a molecule comprising a silicone atom.

The term "carboxylic acid" refers to the —C(═O)OH group (which can also be written as —COOH group). Depending upon pH, the hydrogen atom can be present or absent. Thus, "carboxylic acid" as used herein also includes carboxylate groups (i.e., —C(═O)—$O^-$ groups).

The terms "ester" and "carboxylic acid ester" refer to the group —C(═O)—OR (which can also be written as —COOR), wherein R is alkyl, substituted alkyl, aryl or substituted aryl and to compounds and moieties comprising such a group.

As used herein, the terms "siloxy" and "silyl ether" refer to groups or compounds including a silicon-oxygen (Si—OR) bond and wherein R is an organic group, such as a substituted or unsubstituted alkyl or aryl group (i.e., methyl, ethyl, phenyl, etc.). In some embodiments, the terms refer to compounds comprising one, two, three, or four alkoxy, aralkoxy, or aryloxy groups bonded to a silicon atom. Each alkyloxy, aralkoxy, or aryloxy group can be the same or different.

As used herein, a "monomer" refers to a molecule that can undergo polymerization, thereby contributing constitutional units, i.e., an atom or group of atoms, to the essential structure of a macromolecule.

As used herein, a "macromolecule" refers to a molecule of high relative molecular mass, the structure of which comprises the multiple repetition of units derived from molecules of low relative molecular mass, e.g., monomers and/or oligomers.

An "oligomer" refers to a molecule of intermediate relative molecular mass, the structure of which comprises a small plurality (e.g., 2, 3, 4, 5, 6, 7, 8, 9, or 10) of repetitive units derived from molecules of lower relative molecular mass.

A "polymer" refers to a substance comprising macromolecules. In some embodiments, the term "polymer" can include both oligomeric molecules and molecules with larger numbers (e.g., >10, >20, >50, >100) of repetitive units. In some embodiments, "polymer" refers to macromolecules with at least 10 repetitive units.

A "copolymer" refers to a polymer derived from more than one species of monomer.

As used herein, a "block macromolecule" refers to a macromolecule that comprises blocks in a linear sequence. A "block" refers to a portion of a macromolecule that has at least one feature that is not present in the adjacent portions of the macromolecule. A "block copolymer" refers to a copolymer in which adjacent blocks are constitutionally different, i.e., each of these blocks comprises constitutional units derived from different characteristic species of monomer or with different composition or sequence distribution of constitutional units.

A "branch point" (or "junction point") refers to a point on a polymer chain (e.g., a main chain) at which a branch is attached. A "branch," also referred to as a "side chain," "graft," or "pendant chain," is a monomeric, oligomeric or polymeric offshoot from a macromolecule chain. In some embodiments, the graft is added to a reactive group on the polymer main chain after polymerization of the polymer main chain. An oligomeric branch can be termed a "short chain branch," whereas a polymeric branch can be termed a "long chain branch."

A "chain" refers to the whole or part of a macromolecule, an oligomer, or a block comprising a linear or branched sequence of constitutional units between two boundary constitutional units, wherein the two boundary constitutional units can comprise an end group, a branch point, or combinations thereof.

A "main chain" or "backbone" refers to a linear chain from which all other chains are regarded as being pendant.

A "side chain" refers to a linear chain which is attached to a main chain at a branch point.

An "end group" (or "terminal group") refers to a constitutional unit that comprises the extremity of a macromolecule or oligomer and, by definition, is attached to only one constitutional unit of a macromolecule or oligomer.

II. General Considerations

In some embodiments, the presently disclosed subject matter provides a one-part (or 1 K) adhesive composition suitable for use with TPUs. In some embodiments, the adhesive comprises: (A) a grafted phenoxy resin, (B) a polymaleimide compound, and (C) an organic carbonate. The grafted phenoxy resin can be grafted with carboxylic acids and/or acrylate esters. In some embodiments, the presently disclosed adhesive can further comprise a silane adhesion promoter. The presently disclosed adhesives can provide rubber tearing bonds between TPUs and rigid substrates. For instance, the presently disclosed adhesives provide a unique combination of chemical functionalities that result in diffusion, entanglement and hydrogen bonding, leading to rubber tearing bonds in very short mold times and/or at low temperature (e.g., less than 100° F.).

II.A. Grafted Phenoxy

Phenoxy reins are commercially important thermoplastic polymers derived from bisphenols and epichlorohydrin. Their molecular weights are higher, i.e., at least about 45,000, than those of conventional epoxy resins, i.e., 8,000 maximum. They lack terminal epoxide functionality and are therefore thermally stable and can be fabricated by conventional thermoforming techniques. Phenoxy resins are prepared by reaction of high purity bisphenol A with epichlorohydrin in a 1:1 mole ratio. Solution polymerization can be employed to achieve the molecular weight and processability needed.

Phenoxy resins are useful in the presently disclosed adhesive composition, in part, due to the hydroxyl moieties on the backbone of the resin. Without being bound to any one theory, it is thought that the hydroxyl moieties supply increased chemisorption at the substrate interface (e.g., at the rigid plastic or metal substrate interface) in the form of hydrogen bonding and dispersive forces, in addition to providing for increased diffusion across the elastomer or liquid plastic interface, giving ample opportunities for covalent bonding in the form of crosslinking and entanglement during a curing process.

In some embodiments of the presently disclosed subject matter, component (A), the grafted phenoxy resin, comprises a phenoxy resin comprising grafts comprising carboxylic acid and/or ester moieties. For example, the grafted phenoxy resin can be a phenoxy resin grafted with methacrylic acid (MAA) and/or methyl methacrylate (MMA). Grafting these moieties on the phenoxy resin increases the molecular weight of the polymer and provides additional chemical functionality. Exemplary phenoxy resins that can be used in the presently disclosed adhesive include polymers of bisphenol "A", such as diglycidyl ethers of bisphenol "A", that have had a carboxylic acid (e.g., acrylic acid) and/or an ester (e.g., an acrylic acid ester) grafted thereto.

In some embodiments of the presently disclosed subject matter, any solvent-soluble phenoxy resin can be modified/grafted with a carboxylic acid and/or ester functionality (e.g., from methacrylic acid and/or methyl methacrylate) for use in an adhesive. Solvent-soluble phenoxy resins are known in the art from a number of producers. In some embodiments, the solvent-soluble phenoxy resin is a solid PKHH grade resin sold by Gabriel Performance Products, LLC (Akron, Ohio, United States of America) or PKHS-40, which is a PKHH grade resin pre-dissolved in methyl ethyl ketone (MEK).

In some embodiments of the presently disclosed subject matter, the phenoxy resin is grafted to the extent that the molecular weight has been about doubled, e.g., from about 50,000 to about 100,000.

In some embodiments of the presently disclosed subject matter, the phenoxy resin comprises at least one of polyvinyl butyral, bisphenol A, or bisphenol F epoxies or combinations thereof. The carboxylic acid and/or ester functionalities can then be grafted thereon as described herein.

In some embodiments of the presently disclosed subject matter, the phenoxy resin itself comprises carboxylic acid and/or ester functionality, such as a copolymer of methacrylic acid and an acrylic acid ester, preferably ethyl acrylate.

In some embodiments of the presently disclosed subject matter, the carboxylic acid functionality is introduced by grafting a moiety onto the phenoxy resin, wherein the grafted moiety comprises a monovalent derivative of at least one of methacrylic acid, maleic anhydride, formic acid, acetic acid, propionic acid, butyric acid, pentanoic acid or hexanoic acid. In some embodiments, an acrylate ester functionality is introduced by grafting a compound comprising a carboxylic acid ester group onto the phenoxy resin where the compound comprises one of the group including, but not limited to, methyl methacrylate, ethyl acrylate, hydroxy ethyl acrylate, hydroxy ethyl methacrylate, phenoxy ethyl acrylate, butyl acrylate and related higher esters. An example of a suitable grafting process employing compounds with alkene functionality (e.g., carboxylic acids and ester compounds with alkene functionality), such as methyl methacrylate (MMA) and methacrylic acid (MAA), is described in Example 1 of U.S. Pat. No. 6,034,160, the disclosure of which is incorporated herein by reference in its entirety and is illustrated in Scheme 1, below.

Scheme 1. Exemplary Grafting Process.

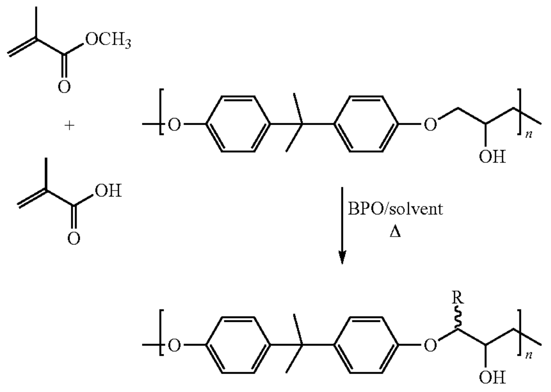

R = graft (monomeric, oligomeric or polymeric chain comprising moieties from MMA, MAA or both)

As can be seen in Scheme 1, a phenoxy resin is mixed with methyl methacrylate and methacrylic acid in the presence of a free radical initiator (e.g., benzoyl peroxide (BPO)) in a suitable solvent (e.g., methyl ethyl ketone (MEK)) and heated. The resulting representative grafted polymer (i.e., the grafted phenoxy resin) comprises graft chains comprising carboxylic acid and/or ester groups attached to the polymer backbone in addition to comprising hydroxyl groups on the backbone.

With the addition of the grafted carboxylic acid and/or ester groups, various types of crosslinking chemistry can be performed. For example, crosslinking reactions with compounds such as, but not limited to, isocyanates, methylol, silanol, amine, bases, epoxy (as a curative), and aldehydes can be performed. In addition, condensation reactions and esterification/transesterification reactions can be used for crosslinking. The added carboxylic acid and/or ester groups also can have interactions with hydrogen bonding compounds, strong chemisorption bonds formed on metals, and can react with other polymers, such as, but not limited to polyamides and polycarbonates. For example, carboxylic acid groups can react with isocyanate groups for quick crosslinking in injection molding processes.

In some embodiments, the grafted phenoxy resin comprises about 10 to about 96 percent (%) (e.g., about 10, 15, 20, 25, 30, 35, 40, 45, 50, 55, 60, 65, 70, 75, 80, 85, 90 or about 96%) by weight based on the total weight of A+B+C (i.e., the total combined weight of the grafted phenoxy resin, the polymaleimide compound, and the organic carbonate). In some embodiments, the grafted phenoxy resin comprises about 5 weight % to about 25 weight % of the adhesive formulation as a whole (e.g., about 5, 6, 7, 8, 9, 10, 11, 12, 13, 14, 15, 26, 17, 18, 19, 20, 21, 22, 23, 24, or about 25 weight %).

II.B. Bismaleimide

In some embodiments, the adhesive further comprises a polymaleimide compound. The polymaleimide compound can be any compound containing at least two maleimide groups. The maleimide groups can be attached to one another or can be joined to and separated by an intervening divalent radical such as alkylene, cycloalkylene, epoxydimethylene, phenylene (all 3 isomers), 2,6-dimethylene-4-alkylphenol, or sulfonyl.

In some embodiments, the polymaleimide compound comprises an aromatic polymaleimide compound. In some embodiments, the aromatic polymaleimide comprises has about 2 to 100 aromatic nuclei wherein no more than one maleimide group is directly attached to each adjacent aromatic ring. Such aromatic polymaleimides are well-known in the art and are sold under different trade names by different companies, such as BMI-M-20 and BMI-S aromatic polymaleimides supplied by Mitsui Chemicals, Incorporated (Tokyo, Japan). In some embodiments, the polymaleimide is BMI-M-20 (also referred to herein as BMI M20 or M20).

In some embodiments, the polymaleimide compound is a polymaleimide compound wherein the maleimide groups are attached to a phenylene radical. For example, one such polymaleimide is m-phenylene bismaleimide, which is available as HVA-2 from E.I. Du Pont de Nemours & Co. (Wilmington, Delaware, United States of America).

In some embodiments, the polymaleimide compound comprises about 2 to about 75 weight % (e.g., about 2, 5, 10, 15, 20, 25, 30, 35, 40, 45, 50, 55, 60, 65, 70, or about 75 weight %) of the adhesive composition based on the total of A+B+C (i.e., the total weight of the grafted phenoxy resin, the polymaleimide compound, and the organic carbonate). In some embodiments, the polymaleimide comprises about 1 weight % to about 25 weight % of the adhesive as a whole (e.g., about 1, 2, 3, 4, 5, 6, 7, 8, 9, 10, 11, 12, 13, 14, 15, 16, 17, 18, 19, 20, 21, 22, 23, 24, or about 25 weight %).

II.C. Organic Carbonate

In some embodiments, the adhesive comprises an organic carbonate. In some embodiments, the organic carbonate comprises propylene carbonate. While not wishing to be bound by the theory, it is believed that propylene carbonate can play a role in bonding, most likely carrying the polymer (i.e., the phenoxy resin) into the TPU through diffusion.

Examples of other such carbonates include, but are not limited to, dimethyl carbonate, diethyl carbonate, dipropyl carbonate, dibutyl carbonate, dipentylcarbonate, dihexyl carbonate, dioctyl carbonate, diphenyl carbonate, diallyl carbonate, ditolyl carbonate, butyl phenylcarbonate, 1,3-dioxolan-2-one (ethylene carbonate), 4-methyl-1,3-dioxolan-2-one (propylene carbonate), 4-ethyl-1,3-dioxolan-2-one (butylene carbonate), 4-propyl-1,3-dioxolan-2-one, 4-vinyl-1,3-dioxolan-2-one, 1,3-dioxan-2-one (trimethylenecarbonate), 5-dimethyl-1,3-dioxan-2-one (neopentylene carbonate), 4-methoxy-methyl-1,3-dioxolan-2-one, 4-ethoxymethyl-1,3-dioxolan-2-one, 4-phenoxy-methyl-1,3-dioxolan-2-one, 4-acetoxymethyl-1,3-dioxolan-2-one, erythritol bis(carbonate) and 2,5-dioxahexanoate.

In some embodiments, the organic carbonate has a cyclic structure such as 1,3-dioxolan-2-one (ethylene carbonate), 4-methyl-1,3-dioxolan-2-one (propylene carbonate), 4-ethyl-1,3-dioxolan-2-one (butylene carbonate) or a glycerol carbonate in which the O-bonded hydrogen of the exocyclic —$CH_2OH$ group has been replaced by NCO-unreactive substituents, such as, but not limited to, optionally substituted alkyl, acyl, aryl or aralkyl groups.

In some embodiments, a cyclic sulfone or sulfolane material can be employed to perform the function of the organic carbonate. Thus, in some embodiments, the organic carbonate is replaced by a cyclic sulfone or sulfolane.

In some embodiments, the organic carbonate comprises up to about 80 weight % of the adhesive based on the total of A+B+C. In some embodiments, the organic carbonate comprises about 1 weight % to about 15 weight % of the adhesive formulation as a whole (e.g., about 1, 2, 3, 4, 5, 6, 7, 8, 9, 10, 11, 12, 13, 14, or about 15 weight %).

II.D. Silane

In some embodiments, the presently disclosed adhesive comprises a silane-based adhesion promoter. In some embodiments, the silane-based adhesion promoter is a silane-containing material that comprises at least one of an epoxy functional silane or a ureidosilane.

Epoxy functional silane compounds suitable for use in the presently disclosed adhesive include any epoxy functionalized silane compounds capable of reacting with the grafted phenoxy resin. Examples of suitable epoxy functional silane compounds include, but are not limited to, 3-glycidoxypropyltrimethoxysilane, 3-glycidoxypropyldimethoxysilane, 3-glycidoxypropyldimethylmethoxysilane, 2-(3,4-epoxycyclohexyl)-ethyltrimethoxysilane and the like. Such compounds are generally available commercially (for example, 3-glycidoxypropyltrimethoxysilane is available from Aldrich Chemical (part of MillaporeSigma, St. Louis, Missouri, United States of America) and 3-glycidoxypropyltrimethoxysilane and beta-(3,4-epoxycyclohexyl)-ethyltrimethoxysilane from Gelest Inc. (Morrisville, Pennsylvania, United States of America)) and many of such compounds are known in the literature and are obtainable by art-recognized procedures.

In some embodiments, the silane comprises a ureidosilane. The ureidosilane materials comprise those as set forth in the following formula:

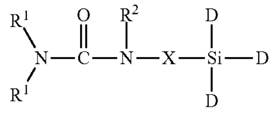

or the hydrolyzates or condensates of such silane wherein D is independently chosen from ($R^3$) or (OR) with the proviso that at least one D is (OR). In the formula, each R is independently chosen from the group consisting of hydrogen, alkyl, alkoxy-substituted alkyl, acyl, alkylsilyl or alkoxysilyl and each R group can be linear or branched and may be the same or different. Preferably, R is individually chosen from the group consisting of hydrogen, ethyl, methyl, propyl, iso-propyl, butyl, iso-butyl, sec-butyl, and acetyl.

X in the above formula is a member selected from the group comprising a bond or a substituted or unsubstituted divalent aliphatic or aromatic group. In some embodiments, X is selected from members of the group comprising a bond, $C_1$-$C_{10}$ alkylene, $C_1$-$C_6$ alkenylene, $C_1$-$C_6$ alkylene substituted with at least one amino group, $C_1$-$C_6$ alkenylene substituted with at least one amino group, arylene and alkylarylene.

The $R^1$ and $R^2$ moieties are individually selected from the group comprising hydrogen, $C_1$-$C_6$ alkyl, cycloalkyl, $C_1$-$C_6$ alkenyl, $C_1$-$C_6$alkyl substituted with at least one amino group, $C_1$-$C_6$ alkenyl substituted with at least one amino group, arylene and alkylarylene. In some embodiments, each $R^1$ is individually selected from the group consisting of hydrogen, ethyl, methyl, propyl, iso-propyl, butyl, iso-butyl, sec-butyl, tert-butyl, cyclohexyl and acetyl.

As used herein, the term "substituted" aliphatic or aromatic means an aliphatic or aromatic group wherein the carbon backbone can have a heteroatom (e.g., O, N, or S) located within the backbone or a heteroatom or heteroatom containing group attached to the carbon backbone.

In some embodiments, $R^3$ of the formula above is a monovalent hydrocarbon group having from 1 to 10 carbon atoms. The $R^3$ group can include alkyl, aryl, and aralkyl groups such as methyl, ethyl, butyl, hexyl, phenyl, or benzyl. In some embodiments, $R^3$ is a $C_1$-$C_4$ alkyl. In some embodiments, $R^3$ is methyl.

In some embodiments, the ureidosilane comprises at least one of 3-uridopropyltriethoxysilane and 3-uridopropyltrimethoxysilane.

In some embodiments, functional silanes other than epoxy- or ureido-silanes can be employed. In some embodiments, these functional silanes can comprise at least one of an amino, polyamino, amido, aldehyde, acrylate, anhydride, aromatic, carboxylate, isocyanato, epoxy, ester, hydroxyl, methacryloxy, olefin, phosphine, phosphate, sulfur, mercapto, urethane, vinyl functional silane, or combinations thereof.

In some embodiments, the silane-based adhesion promoter is present in an amount up to about 15 weight % based on the total weight of A+B+C+D (i.e., the total weight of the functionalized phenoxy resin, the polymaleimide, the organic carbonate and the silane-based adhesion promoter). In some embodiments, the silane-based adhesion promoter is present in an amount of about 0.01 weight % to about 10 weight % based on the total of A+B+C+D. In some embodiments, the silane-based adhesion promoter is present in an amount of between about 0.25 weight % to about 5.0 weight % of the total adhesive formulation. In some embodiments, the silane-based adhesion promoter is present in an amount of about 0.4 to about 1.5 weight % (e.g., about 0.40, 0.45, 0.50, 0.55, 0.60, 0.65, 0.70, 0.75, 0.80, 0.85, 0.90, 0.95. 1.00, 1.05, 1.10, 1.15, 1.20, 1.25, 1.30, 1.35, 1.40, 1.45, or about 1.5 weight %) of the total adhesive formulation.

II.E. Cyclohexanone

In some embodiments, the presently disclosed adhesive is provided in a solvent based system. Non-limiting examples of suitable solvents include, but are not limited to, hexane, toluene, xylene, chlorobenzene, ethyl acetate, butyl acetate, diethylene glycol dimethyl ether, dipropylene glycol dimethyl ether, ethylene glycol monomethyl or monoethyl ether acetate, diethylene glycol-ethyl and butyl ether acetate, propylene glycol monomethyl ether acetate, 1-methoxy-prop-2-yl acetate, 3-methoxy-n-butyl acetate, propylene glycol diacetate, acetone, methyl ethyl ketone, methyl isobutyl ketone, cyclohexanone, lactones such as β-propiolactone, γ-butyrolactone, ε-caprolactone and ε-methyl caprolactone, for example, but also solvents such as N-methylpyrrolidone and N-methylcaprolactam, 1,2-propylene carbonate, methylene chloride, dimethyl sulphoxide, triethyl phosphate or any mixtures of such solvents. In some embodiments, the solvent-based adhesive comprises xylene, methyl ethyl ketone (MEK), cyclohexanone or mixtures thereof as the primary carrier/solvent.

II.F. Other Components

In some embodiments, the presently disclosed adhesives can also include other ingredients, such as, but not limited to dyes, pigments or other coloring agents. For example, the adhesive can include a solvent dye, such as an anthraquinone-based dye known in the art for coloring resins. Additionally or alternatively, the adhesive can comprises one or more other additives known in the adhesives art, such as, but not limited to a plasticizer, a filler (e.g., zinc oxide), and a rheology modifier.

II.G. Bonded Assemblies

In some embodiments, the presently disclosed adhesive can be used to bond a liquid-introduced TPU to a rigid substrate in a mold. The "liquid-introduced TPU" refers to a TPU initially contacted with an adhesive or adhesive-coated substrate in liquid form, but which can later cure to form a solid. Thus, for example, the adhesive can be used in injection or compression molding. In some embodiments, the rigid substrate comprises or consists of a rigid plastic (e.g., polycarbonate or a polyamide) or a metal (e.g., stainless steel or aluminum).

In some embodiments, the presently disclosed subject matter provides a bonded assembly comprising a liquid introduced thermoplastic urethane bonded to a rigid substrate with an adhesive comprising a grafted phenoxy resin, a polymaleimide, an organic carbonate and optionally an adhesion promoter. In some embodiments, the adhesive can further comprise a dye or other coloring agent. In some embodiments, the rigid substrate comprises or consists of a rigid polymer or a metal, such as, but not limited to, polycarbonate, polyamide, stainless steel, and aluminum.

In some embodiments, the presently disclosed subject matter provides a bonded assembly comprising a liquid introduced TPU bonded to a rigid substrate with an adhesive comprising a grafted phenoxy resin and a silane adhesion promoter. Thus, in some embodiments, the organic carbonate and/or polymaleimide are not included in the adhesive. In some embodiments, the grafted phenoxy resin comprises carboxylic acid and/or ester functionality. In some embodiments, the silane adhesion promoter is an epoxy functional silane. In some embodiments, the epoxy functional silane comprises or consists of glycidoxypropyltrimethoxysilane. In some embodiments, the adhesive further comprises cyclohexanone and/or another suitable solvent as described hereinabove.

II.H. Methods

In some embodiments, the presently disclosed subject matter provides a method of bonding two dissimilar materials (e.g., in an injection or compression molding process) comprising: selecting a rigid substrate; selecting a liquid introduced substrate; and providing an adhesive comprising a grafted phenoxy resin, a polymaleimide, an organic carbonate and optionally an adhesion promoter. In some embodiments, the liquid introduced substrate is a TPU or other thermoplastic elastomer that is a liquid prior to curing. In some embodiments, the rigid substrate comprises or consists of a rigid polymer or a metal. In some embodiments, the rigid substrate comprises or consists of a material selected from polycarbonate, polyamide, stainless steel and aluminum. In some embodiments, the grafted phenoxy resin comprises carboxylic acid and/or ester functionality.

Alternatively, in some embodiments, the adhesive comprises a grafted phenoxy resin (e.g., a grafted phenoxy resin comprising carboxylic acid and/or ester functionality) and a silane adhesion promoter and the liquid introduced substrate is a TPU. In some embodiments, the silane adhesion promoter comprises an epoxy functional silane. In some embodiments, the epoxy functional silane is glycidoxypropyltrimethoxysilane.

In some embodiments, the adhesive is applied to the selected rigid substrate to provide an adhesive-coated rigid substrate and the liquid introduced substrate is injected onto or otherwise applied to the adhesive-coated rigid substrate. In some embodiments, the liquid introduced substrate is melted prior to being injected or otherwise applied to the adhesive-coated rigid substrate. In some embodiments, the adhesive-coated rigid substrate is present in a mold. In some embodiments, the mold is heated at a temperature of 100° F. or less (e.g., at a temperature between about 75° F. and about 100° F.). In some embodiments, the adhesive-coated rigid substrate is not heated above the mold temperature prior to being contacted with the liquid introduced rigid substrate. In some embodiments, the adhesive-coated rigid substrate is heated to about 300° F. for about 30 minutes prior to being contacted with the liquid introduced rigid substrate. In some embodiments, the method further comprises a heating step following the injection or other application of the liquid introduced substrate. In some embodiments, the heating step comprises heating to a temperature of about 250° F. for a few minutes (e.g., about 30 minutes) in a post bake process.

EXAMPLES

The following examples are included to further illustrate various embodiments of the presently disclosed subject matter. However, those of ordinary skill in the art should, in light of the present disclosure, appreciate that many changes can be made in the specific embodiments which are disclosed and still obtain a like or similar result without departing from the spirit and scope of the presently disclosed subject matter.

Example 1

Three exemplary one-component adhesive compositions (7825A, 71-1-8, and 17007-86D) of the presently disclosed subject matter were prepared according to the formulas provided in Table 1, below.

TABLE 1

TPU Adhesive Formulas

| COMPONENT | SOLID | WET |
|---|---|---|
| **7825A** | | |
| PKHS-27 (27% in MEK) | 15.5 | 57.4 |
| JEFFSOL PROPYLENE CARBONATE | 0 | 3.85 |
| BMI M20 | 7.75 | 7.75 |
| CYCLOHEXANONE | 0 | 31 |
| | 23.25% | 100 |
| **71-1-8** | | |
| PKHS-27 (27% in MEK) | 13.76 | 50.96 |
| JEFFSOL PROPYLENE CARBONATE | 0 | 13.75 |

TABLE 1-continued

TPU Adhesive Formulas

| COMPONENT | SOLID | WET |
|---|---|---|
| **7825A** | | |
| BMI M20 | 6.88 | 6.88 |
| CYCLOHEXANONE | 0 | 28.41 |
| | 20.64% | 100 |
| **17007-86D** | | |
| PKHS-27 (27% in MEK) | 13.79 | 51.07 |
| JEFFSOL PROPYLENE CARBONATE | 0 | 13.79 |
| BMI M20 | 6.9 | 6.9 |
| CYCLOHEXANONE | 0 | 27.59 |
| Silane A-187 | 0.65 | 0.65 |
| | 21.34% | 100.00 |

The modified phenoxy of the above adhesive formulas is PKHS-27, available from Gabriel Performance Products, LLC (Akron, Ohio, United States of America), and which comes in solution at 27% in methyl ethyl ketone (MEK). The polymaleimide (M20) is a powder. Prior to adding to the adhesive composition, the M20 is stirred into cyclohexanone at 20% total solids content (TSC) and heated to 80-90° C. for 20-30 minutes with stirring. Without being bound to any one theory, it is believed that providing the M20 in solution facilitates film formation and reactivity (i.e., a low temperatures). The PKHS-27, M20 in solution, and propylene carbonate are then combined. These formulas can be colored/tinted with dyes or with ground pigments as desired.

Results of some of the initial testing are listed below. The adhesive formulas were used at about 1 mil dry film thickness (DFT) with stainless steel coupons as the solid substrate. The adhesives were dried at 200° F. for 30 minutes with no prebake or post-bake. TPUs included polyester-based TPUs sold under the tradenames AVALON® (Huntsman Corporation, The Woodlands, Texas, United States of America) and ELASTOLLAN™ (BASF SE, Ludwigshafen, Germany); thermoplastic vulcanates sold under the tradenames SANTOPRENE™ (ExxonMobil Corporation, Irving, Texas, United States of America) and TPS/V™ (Dow Corning, Midland, Michigan, United States of America); and polyether-based aromatic TPUs sold under the tradename TEXIN™ (Covestro A G, Leverkusen, Germany).

Primary adhesion was measured by pulling at 90° and 12 inches per min. Results of some of the initial testing are listed below in Tables 2-4. The abbreviations used for the failure modes are as follows: R refers to failure in the body of the rubber (i.e., the thermoplastic elastomer); RC refers to failure at the rubber to cement interface (i.e., the thermoplastic elastomer/adhesive interface); and TR refers to thin rubber, and CM refers to cement to metal failure as described in ASTM D429 Method B.

TABLE 2

Primary Adhesion Results with 7825A Adhesive Formula

| TPU | Average % R | Average % TR | Average % RC | Average Pull Force (lbs) |
|---|---|---|---|---|
| AVALON@ 60DB | 0 | 0 | 100 | 13.67 |
| AVALON@ 95AB | 0 | 0 | 100 | 19.00 |
| ELASTOLLAN ™ 1185A10 | 0 | 10 | 90 | 31.33 |
| ELASTOLLAN ™ 1195A10 | 0 | 10 | 90 | 35.00 |
| ELASTOLLAN ™ 590A10 | 11.67 | 10 | 78.33 | 42.67 |
| ELASTOLLAN ™ 5H4/Z26 | 5 | 0 | 95 | 29.00 |

TABLE 2-continued

Primary Adhesion Results with 7825A Adhesive Formula

| TPU | Average % R | Average % TR | Average % RC | Average Pull Force (lbs) |
|---|---|---|---|---|
| ELASTOLLAN ™ EC98A10 | 0 | 20 | 80 | 40.50 |
| ELASTOLLAN ™ LP9277 | 5 | 0 | 95 | 34.33 |
| TEXIN ™ 1209 | 85 | 0 | 15 | 45.33 |

TABLE 3

Primary Adhesion Results with 71-1-8 Adhesive Formula

| TPU | Average % R | Average % TR | Average % RC | Average Pull Force (lbs) |
|---|---|---|---|---|
| AVALON@ 60DB | 85 | 0 | 15 | 50.00 |
| AVALON@ 95AB | 16.67 | 10 | 73.33 | 56.33 |
| ELASTOLLAN ™ 1185A10 | 0 | 30 | 70 | 42.33 |
| ELASTOLLAN ™ 1195A10 | 0 | 20 | 80 | 49.67 |
| ELASTOLLAN ™ 590A10 | 43.33 | 10 | 46.67 | 44.67 |
| ELASTOLLAN ™ 5H4/Z26 | 6.67 | 0 | 93.33 | 27.00 |
| ELASTOLLAN ™ EC98A10 | 20 | 25 | 55 | 77.00 |
| ELASTOLLAN ™ LP9277 | 5 | 0 | 95 | 24.67 |
| TEXIN ™ 1209 | 75 | 5 | 20 | 47.33 |

TABLE 4

Primary Adhesion Results with 17007-86D Adhesive Formula

| TPU | Average % R | Average % RC | Average % CM | Average Pull Force (lbs) |
|---|---|---|---|---|
| AVALON@ 60DB | 0 | 94 | 6 | 59 |
| ELASTOLLAN ™ EC98A10 | 80 | 20 | 0 | 83 |
| SANTOPRENE ™ 121-60M20086D | 0 | 100 | 0 | 0 |
| TEXIN ™ 1209 | 77 | 23 | 0 | 45 |
| TPS/V ™ 4000-70A | 100 | 0 | 0 | 27 |

Discussion: Without being bound by any one theory, it is believed that the grafted phenoxy resin of the presently disclosed adhesive can diffuse into the TPU and entangle. In addition, the resin can form hydrogen bonds once it is entangled in the TPU. There is also evidence to suggest that the grafted phenoxy resin can interact with the hard blocks in the TPU while in the liquid state and then become entangled when the hard blocks start to pack in the cool down. Again without being bound to any one theory, the propylene carbonate can drive both the grafted phenoxy resin and the bismaleimide into the TPU, as it tends to migrate across the TPU/adhesive interface and become part of the TPU in the final assembly. Additionally, the bismaleimide is known to chemisorb to metal substrates and could have the capability of diffusing into the TPU with the propylene carbonate. In addition, the functional groups of the bismaleimide can interact (from a physical standpoint, not chemical) with both the grafted phenoxy resin and the hard blocks in the TPU. If this occurs during the liquid phase, there is a good case for entanglement when the TPU cools. Further, the epoxy silane (if present) can chemisorb to the metal and crosslink with the carboxylic acid functionality on the grafted resin.

Currently, the best commercial TPU adhesives fail to bond with many substrates showing 100% CM failure (i.e., cement/metal failure or failure at the interface of the cement (i.e., the adhesive) and the metal or other rigid substrate).

The presently disclosed adhesive can achieve nearly 100% rubber adhesion. The 71-1-8 formula described in Table 1, above bonds 9/9 TPUs with some degree of rubber retention and an average pull value for all TPUs of greater than 40 lbs pull. Accordingly, the presently disclosed subject matter provides viable TPU adhesives that can be refined for the injection molding market, a market that is continuing to grow.

This is a 1 k system that is easily applied and fits into the injection mold application process. The adhesive does not need to be pre-baked nor do the parts need to be post-baked as required by other adhesive systems to achieve bonding. Generally, 2K (two-component) adhesive systems are recommended for bonding TPUs to rigid substrates. It has also previously been rare to get rubber tearing bonds with TPU adhesives that are not utilizing a post-cure/bake process.

BMI-M20 is a well-known curative for peroxide cure elastomers but its utility in bonding TPUs has never been established. TPEs and TPUs are not thermosets and, therefore, do not employ peroxides to achieve crosslinking. Thus, the presently disclosed results, in which it appears that BMI-M20 improves results in bonding non-peroxide cured compounds were unexpected. Without being bound to any one theory, it is believed that these unexpected results are the product of using pre-solvated BMI-M20 (e.g., BMI-M20 dissolved in cyclohexanone at 20%). This can facilitate ease of mixing, film formation, faster interactions, and superior bonding capabilities over conventional ground in BMI-M20.

Example 2

An additional exemplary one-component adhesive composition was prepared according to the formula provided in Table 5, below. The composition was originally used with castable urethanes, but has now been found to work well with a range of TPUs, e.g., when coupled with a minor postbake of about 30 minutes at 121° C.

As in the formulas described in Example 1, above, the modified phenoxy of the above adhesive formulas is PKHS-27, available from Gabriel Performance Products, LLC (Akron, Ohio, United States of America), and comes in solution at 27% in methyl ethyl ketone (MEK). This was mixed with a silane adhesion promoter, i.e., gamma-glycidoxypropyltrimethoxysilane, which is sold under the tradename SILQUEST A187™ (Momentive Performance Materials Inc., Waterford, New York, United States of America) and an anthraquinone dye, sold under the tradename KEYPLAST™ Blue A (Milliken and Company Corporation, Spartanburg, South Carolina, United States of America) in MEK and cyclohexanone.

TABLE 5

Additional 1K Adhesion Formula 17007-88H (CH 701)

| COMPONENTS | SOLID | WET |
|---|---|---|
| PKHS-27 (27% IN MEK) | 14.1 | 52.22 |
| SILQUEST A-187 ™ | 0.873 | 0.873 |
| KEYPLAST ™ Blue A | 0.027 | 0.027 |
| Cyclohexanone | 0.00 | 11.72 |
| Methyl Ethyl Ketone | 0.00 | 35.16 |
| Totals | 15.0 | 100.00 |

The adhesive was used to bond injection molded TPUs onto grit blasted steel coupons. The TPUs were the same as those used for Example 1 above with the addition of a TPU sold under the tradename IROGRAN® (Huntsman Corporation, The Woodlands, Texas, United States of America). Primary adhesion was measured by pulling at 90° and 12 inches per minute. Results of some of the initial testing for assemblies where there was no adhesive prebake and a postbake at 250° F. for 30 minutes are provided in Table 6. Results for assemblies where there was a 30 minute 300° F. prebake and a 30 minute 250° F. postbake are provided in Table 7. Average % COOH refers to cohesive failure within the adhesive layer.

TABLE 6

Primary Adhesion Results with Additional Adhesive Formula, No prebake, 30 minute postbake.

| TPU | Average % R | Average % TR | Average % COH | Average Pull Force (lbs) |
|---|---|---|---|---|
| AVALON@ 60B | 0 | 100 | 0 | 47 |
| AVALON@ 95AB | 0 | 100 | 0 | 24 |
| ELASTOLLAN ™ 1185 | 100 | 0 | 0 | 79 |
| ELASTOLLAN ™ 1195 | 100 | 0 | 0 | 86 |
| ELASTOLLAN ™ 590A | 100 | 0 | 0 | 88 |
| ELASTOLLAN ™ 5H4/Z26 | 100 | 0 | 0 | 38 |
| ELASTOLLAN ™ EC98A | 100 | 0 | 0 | 103 |
| ELASTOLLAN ™ LP9277 | 100 | 0 | 0 | 43 |
| IROGRAN ®-200 | 74 | 0 | 26 | 75 |
| TEXIN ™ 1209 | 80 | 0 | 20 | 54 |
| TPSN ™ 4000-70A | 100 | 0 | 0 | 30 |

TABLE 7

Primary Adhesion Results with Additional Adhesive Formula, Prebake and Postbake.

| TPU | Average % R | Average % TR | Average % COOH | Average Pull Force (lbs) |
|---|---|---|---|---|
| AVALON@ 60B | 100 | 0 | 0 | 118 |
| AVALON@ 95AB | 100 | 0 | 0 | 86 |
| ELASTOLLAN ™ 1185 | 0 | 30 | 70 | 73 |
| ELASTOLLAN ™ 1195 | 96 | 0 | 4 | 84 |
| ELASTOLLAN ™ 590A | 100 | 0 | 0 | 89 |
| ELASTOLLAN ™ 5H4/Z26 | 100 | 0 | 0 | 39 |
| ELASTOLLAN ™ EC98A | 100 | 0 | 0 | 102 |
| ELASTOLLAN ™ LP9277 | 86 | 0 | 14 | 47 |
| IROGRAN ®-200 | 100 | 0 | 0 | 84 |
| TEXIN ™ 1209 | 0 | 0 | 100 | 46 |
| TPS/V ™ 4000-70A | 100 | 0 | 0 | 31 |

The adhesive comprising the grafted phenoxy resin and the silane is a stable 1K formulation that can be applied by spray, brush, roller or dip application. It is easy to use and works in a range of dry film thickness (DFT) depending upon the TPU. In some embodiments, the adhesive can be used with a DFT of about 0.8 mils to about 1.2 mils (about 20.3 microns to about 30.38 microns) but can also be used with DFTs outside such a range. The adhesive provides rubber tearing bonds with high pull values and works with a wide variety of TPUs.

It will be understood that various details of the presently disclosed subject matter can be changed without departing from the scope of the presently disclosed subject matter. Furthermore, the foregoing description is for the purpose of illustration only, and not for the purpose of limitation.

What is claimed is:

1. A one-component curable adhesive consisting of: (A) a grafted phenoxy resin, (B) a polymaleimide compound, (C) an organic carbonate, and (D) a silane adhesion promoter, wherein the grafted phenoxy resin comprises carboxylic acid and/or ester functionality and wherein the silane adhesion promoter comprises an epoxy functional silane.

2. The adhesive of claim 1, wherein the grafted phenoxy resin comprises a phenoxy resin grafted with methacrylic acid and/or methyl methacrylate.

3. The adhesive of claim 1, wherein the ester functionality comprises a —$COOCH_3$ moiety.

4. The adhesive of claim 1, wherein the organic carbonate comprises propylene carbonate.

5. The adhesive of claim 1, wherein the organic carbonate comprises diphenyl carbonate.

6. The adhesive of claim 1, disposed between a thermoplastic urethane and a metal substrate.

7. The adhesive of claim 1, wherein the grafted phenoxy resin comprises about 10 to about 96 percent by weight based on the total of A+B+C.

8. The adhesive of claim 1, wherein the polymaleimide compound comprises about 2 to about 75 weight percent based on the total of A+B+C.

9. The adhesive of claim 1, wherein the organic carbonate comprises up to about 80 weight percent based on the total of A+B+C.

10. The adhesive of claim 1, wherein the silane adhesion promoter comprises about 0.01 weight percent to about 10 weight percent based on the total of A+B+C+D.

11. The adhesive of claim 1, employed to bond a liquid-introduced thermoplastic urethane to a rigid substrate in a mold.

12. The adhesive of claim 1, wherein the grafted phenoxy resin comprises carboxylic acid functionality.

13. The adhesive of claim 1, wherein the polymaleimide comprises a pre-solvated aromatic polymaleimide.

14. The adhesive of claim 1, wherein the adhesive consists of (A) a grafted phenoxy resin wherein the grafted phenoxy resin comprises carboxylic acid functionality; (B) an aromatic polymaleimide, (C) propylene carbonate, and (D) an epoxy functional silane.

15. A bonded assembly comprising a liquid introduced thermoplastic urethane bonded to a rigid substrate with a one-component adhesive of claim 1.

16. The bonded assembly of claim 15, wherein the rigid substrate comprises at least one of polycarbonate, polyamide, stainless steel, and aluminum.

17. A method of bonding two dissimilar materials in an injection or compression molding process comprising:

selecting a rigid substrate, selecting a liquid introduced substrate, and providing a one-component adhesive of claim 1.

18. A one-component curable adhesive, wherein the adhesive consists of: (A) a grafted phenoxy resin, wherein the grafted phenoxy resin comprises carboxylic acid and/or ester functionality, (B) a polymaleimide compound, (C) an organic carbonate, (D) a silane adhesion promoter, wherein the silane adhesion promoter comprises an epoxy functional silane, and one or more of the group consisting of a solvent, a coloring agent, a plasticizer, a filler, and a rheology modifier.

19. The adhesive of claim 18, wherein the adhesive consists of (A), (B), (C), (D), and a solvent, wherein the solvent comprises cyclohexanone.

* * * * *